United States Patent
Flegel et al.

(10) Patent No.: US 9,710,857 B2
(45) Date of Patent: Jul. 18, 2017

(54) DETECTING ANOMALOUS USER ACTIVITY

(75) Inventors: Ulrich Flegel, Karlsruhe (DE); Shane Bracher, Morningside (AU); Pascal Hochwarth, Mühlhausen (DE); Hermann Resch, Heidelberg (DE); Paola Sala, Heidelberg (DE); Stephan Wollny, Schwetzingen (DE); Hua Wang, Ostringen (DE); Andrew Clark, Queensland (AU); George Mohay, Queensland (AU); Roheena Khan, Queensland (AU); Malcolm Corney, Queensland (AU)

(73) Assignee: SAP SE, Walldorf (DE)

( * ) Notice: Subject to any disclaimer, the term of this patent is extended or adjusted under 35 U.S.C. 154(b) by 1197 days.

(21) Appl. No.: 12/950,884

(22) Filed: Nov. 19, 2010

(65) Prior Publication Data

US 2012/0130724 A1 May 24, 2012

(51) Int. Cl.
*G06Q 10/00* (2012.01)
*G06Q 99/00* (2006.01)
*G06F 11/00* (2006.01)
*G06Q 40/06* (2012.01)

(52) U.S. Cl.
CPC ..................................... *G06Q 40/06* (2013.01)

(58) Field of Classification Search
CPC .............................. G06F 21/50; G06Q 40/025
USPC ................................. 705/26, 318; 726/23, 25
See application file for complete search history.

(56) References Cited

U.S. PATENT DOCUMENTS

| | | | |
|---|---|---|---|
| 7,793,835 B1* | 9/2010 | Coggeshall | G06F 21/552 235/375 |
| 2008/0046334 A1* | 2/2008 | Lee et al. | 705/26 |
| 2008/0172264 A1* | 7/2008 | Hoefelmeyer | 705/7 |
| 2011/0125658 A1* | 5/2011 | Lanxner et al. | 705/318 |

OTHER PUBLICATIONS

Anderson, Gary F., D. A. Selby, and Mark Ramsey. "Insider attack and real-time data mining of user behavior." IBM Journal of Research and Development 51.3.4 (2007): 465-475.*
Best et al. "Continuous fraud detection in enterprise systems through audit trail analysis". The Journal of Digital Forenscs, Security and Law. 2009. 4(1).
Schlegelmilch et al. "Role Mining with ORCA". Proceedings of the 10th ACM Symposium on Access Control Models and Technologies, Stockholm, Sweden. 2005.
Vaidya et al. "RoleMiner: Mining Roles using Subset Enumeration", Proceedings of the 13th ACM Conference on Computer and Communications Security, Virginia, USA. 2006.

* cited by examiner

*Primary Examiner* — Kathleen Palavecino
*Assistant Examiner* — Maame Ofori-Awuah
(74) *Attorney, Agent, or Firm* — Mintz Levin Cohn Ferris Glovsky and Popeo, P.C.

(57) ABSTRACT

Systems, methods and articles for determining anomalous user activity are disclosed. Data representing a transaction activity corresponding to a plurality of user transactions can be received and user transactions can be grouped according to types of user transactions. The transaction activity can be determined to be anomalous in relation to the grouped user transactions based on a predetermined parameter.

19 Claims, 9 Drawing Sheets

DETECTING ANOMALOUS USER ACTIVITY

TECHNICAL FIELD

This disclosure relates generally to data processing and, in particular, to systems and methods for detecting anomalous and/or fraudulent user activity.

BACKGROUND

In today's technology-dependent world, fraudulent activities are quite rampant and involve many aspects, including data and/or information theft, loss, malicious destruction of data or other forms of data abuse by users of computing systems belonging to organizations, corporations, institutions, and other entities. Many such organizations strive to prevent such activity and employ various fraud prevention and data securitization techniques. However, such conventional techniques are designed to prevent only simple kinds of fraud from occurring and may not be enough on their own. Complex fraud schemes built over time, and typically involving various applications, are often difficult to prevent. Enterprise Resource Planning ("ERP") systems provide built-in controls to help prevent occurrence of fraud. However, technical complexity and breadth of these systems pose a challenge for auditors when performing fraud detection audits. An extensive understanding of the business, ERP software and its features can be required in order to conduct effective audits. Furthermore, auditors need to understand the customizable aspects of different ERP systems, as well as keep pace with technology improvements. Hence fraud detection is often a labor-intensive task requiring time, effort and resources for both internal and external auditors.

Because audits are typically conducted periodically, fraud can be detected long after it has occurred, causing greater financial loss to the affected organization. Industry estimates put the average fraud detection time at 18 months. This is clearly a long period of time in which to detect fraud and take appropriate remedial measures.

Thus, there is a need for an automated screening of system transactional data to timely detect suspicious user activity or behavior to allow auditors or other reviewers of such data to focus their attention on investigating suspicious activities rather than manually screening audit trails.

SUMMARY

In one aspect of the current subject matter, a method includes receiving data representing a transaction activity corresponding to a plurality of user transactions performed by a plurality of users, grouping the plurality of user transactions into at least one subset of user transactions according to user transaction type such that each subset of user transactions includes user transactions of the plurality of user transactions having a similar user transaction type, determining that the transaction activity is anomalous in relation to the grouped user transactions based on a predetermined parameter, and flagging the transaction activity that is determined to be anomalous.

In another aspect, a method includes receiving data representing a transaction activity corresponding to a plurality of user transactions performed by a plurality of users, determining a frequency of transactions having at least one user transaction type that are performed by at least one user, generating a mapping of users and user transaction types performed by the at least one user based on the determined frequency of transactions, grouping the plurality of user transactions into at least one subset of user transactions according to user transaction type such that each subset of user transactions includes user transactions of the plurality of user transactions having a similar user transaction type, grouping the plurality of users into at least one user group based on types of transactions performed by the users, generating a plurality of transaction profiles based on the transaction types, associating the at least one user group with at least one of the plurality of transaction profiles based on the transaction types, generating a mapping between the generated transaction profiles by determining a relationship between the generated transaction profiles, and determining that the transaction activity is anomalous in relation to the grouped user transactions based on a predetermined parameter.

In optional variations, one or more of the following features can also be included. A frequency of transactions performed by at least one user and having at least one user transaction type can be determined, and a mapping of users and user transaction types performed by the at least one user can be generated based on the determined frequency of transactions. The plurality of users can be grouped into at least one user group based on types of transactions performed by the users, transaction profiles can be generated based on the transaction types, and user groups can be associated with transaction profiles based on the types of transactions.

A mapping between generated transaction profiles can be generated, and a relationship between the generated transaction profiles can be determined. Based on the relationship between generated transaction profiles, a determination can be made whether the transaction activity is anomalous. An alert can be generated upon determining whether the transaction activity is anomalous. An indication of the transaction activity that is predetermined to be not anomalous can be received, and based on the indication, the transaction activity that is determined to be anomalous can be excluded from being flagged as anomalous. In such an example, the predetermined parameter can includes the indication of transaction activity that is predetermined to be not anomalous.

The transaction activity can be determined to include a particular anomalous feature, for example wherein the predetermined parameter includes the particular anomalous feature. The anomalous feature can be one or more of a type of a transaction performed by a user within a user group in addition to types of transactions that are allowed to be performed by the users within the user group, a large number of transactions performed by a user, a type of transaction performed by a user that is not performed by any other users, and a user performing a transaction of a particular type more often than any other user within a user group to which the user belongs.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION OF THE INVENTION

To address the above-noted and potentially other issues with currently available solutions, one or more implementations of the current subject matter provide methods, systems, articles or manufacture, and the like that can, among other possible advantages, provide systems and methods for detecting anomalous user activity based on various types of transactions performed by the user.

Figure 1:
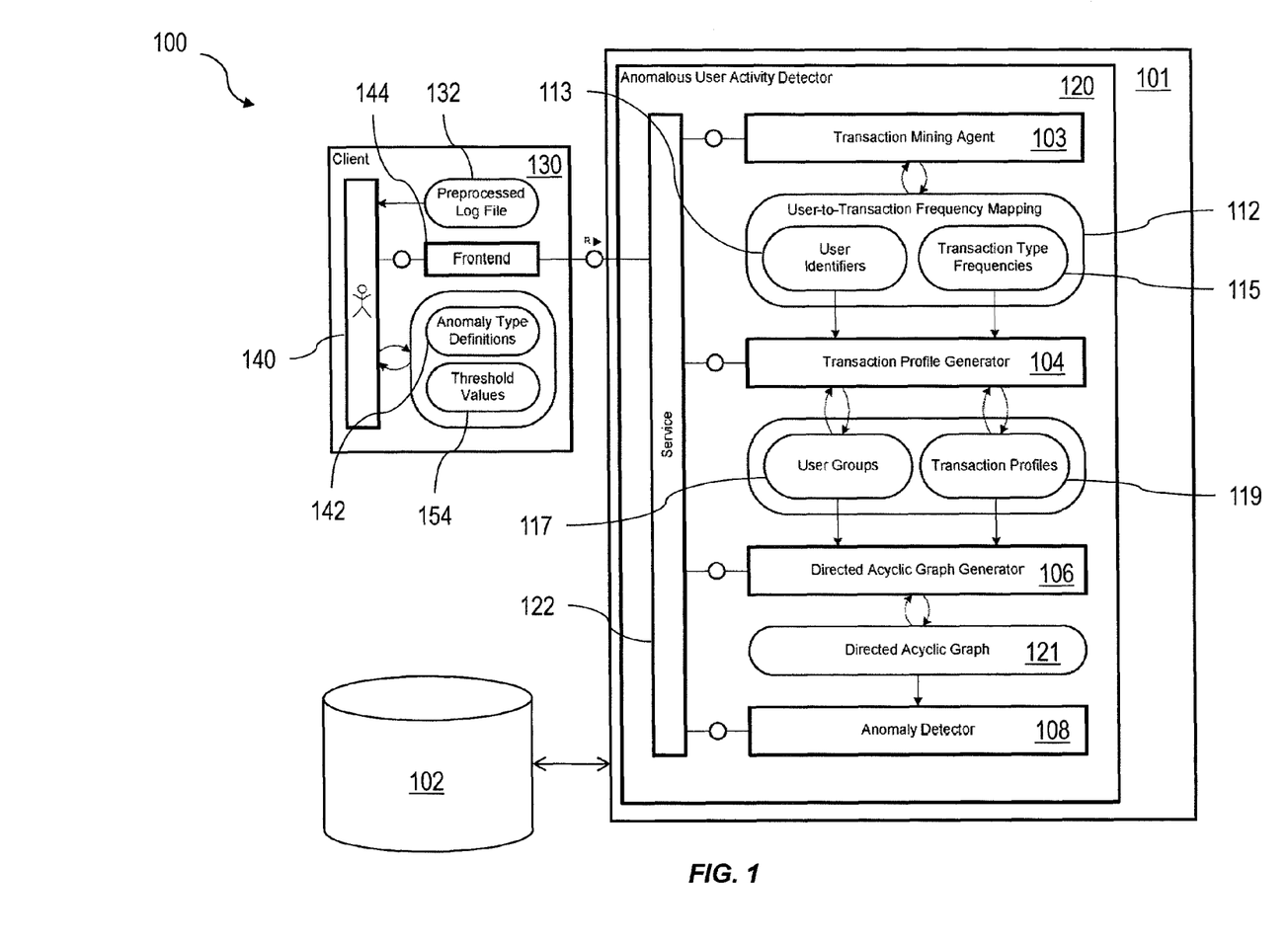
FIG. 1 illustrates an exemplary system for detecting anomalous user activity, according to some implementations of the current subject matter.

FIG. 1 illustrates an exemplary system 100 for analyzing anomalous activity by a user, according to some implementations of the current subject matter. The system 100, which can include one or more programmable processors 101 and one or more machine readable storage media or devices 102, can be configured to receive and process data concerning transaction activity, which can include, but is not limited to, a transaction or a plurality of transactions generated by a user or various users of the system 100 or any other system that can be coupled to the system 100 and to generate a report that shows which user activities appear to be anomalous, according to various predetermined definitions of anomalous activities. For example, system 100 can be a part of an Enterprise Resource Planning ("ERP") system or a part or all of one or more other systems that can be communicatively coupled to the system 100. The system 100 can also parse through user activities to determine which activities, while appearing to be anomalous, should be excluded from such report. These activities can include, for example, activities by a system administrator or the like who has been granted certain rights and privileges. Activities of such a user would not be considered anomalous.

In some implementations, the system 100 can include an anomalous user activity detector 120 that can be configured to be in communication with a client machine 130 or user, for example a processor accessing the processor 101 either locally or over a network. The client machine 130 can include a front end 144, a preprocessed log file, an administrator 140, anomaly type definitions database (or any other type of storage) 142, and threshold values database (or any other type of storage) 154. The detector 120 can configured to include a transaction mining agent 103, a transaction profile generator 104, a directed acyclic graph generator 106, and an anomaly detector 108. Each component of the detector 120 can be configured to communicate with one another via a service component 122. The transaction mining agent 103 can be further configured to communicate with user-to-transaction frequency mapping component 112, which further includes a user identifiers database 113 and a transaction type frequencies database 115. Both databases 113 and 115 can be configured to provide information to the transaction profile generator 104, which in turn communicates with user group database 117 and transaction profiles database 119. The databases 117 and 119 can be configured to provide information to the directed acyclic graph generator component 106, which generates a directed acyclic graph 121 to be provided to the anomaly detector component 108. The anomaly detector component 108 can be provided with information from an anomaly type definitions database 142 and a threshold values database 154 as can be provided by the administrator 140. Each of these components is discussed in further detail below. All communication between the client 130 and the detector 120 can be made through a service 122 and a front end component 144 located at the client, which can be server(s), software or any other suitable means.

A pre-processed log file 132 containing data or information concerning transaction activity or a plurality of transactions can be provided by the client 130 to the detector component 120 for analysis. An exemplary log file is illustrated in Table 1 below. In some implementations, the transaction log file 132 can include information about transaction's date, time, user, terminal, text, and various codes associated with a transaction. As can be understood by one skilled in the relevant art, the transaction log can be configured to include any desired information.

TABLE 1

An example of a transaction log.

| Date | Time | User | Transaction code | Terminal | MNo | Text |
|---|---|---|---|---|---|---|
| 17.03.2008 | 11:54:32 | 233-063 | EC01 | fitgp-s623-206 | AU3 | Transaction EC01 Started |
| 17.03.2008 | 11:54:32 | 233-063 | EC01 | fitgp-s623-206 | AUW | Report RSECOP01 Started |
| 17.03.2008 | 11:54:32 | 233-002 | FB50 | fitgp-s527-017 | AUC | Transaction FB50 Started |

In some implementations, the transaction log can include a timestamp, which corresponds to a date and time field specifying the date and time at which a particular user has performed an activity. It can also include a username or ID, which is assigned to each user and which uniquely identifies that user within the system. The log can specify an activity or a transaction performed by the user via an activity entry. It can also specify a terminal name, e.g., an IP address of a user's computer. Further, the log can include activity or transaction information. This field can include additional information about the activity performed. This information can be in code or text.

Along with the transaction log file 132, the client 130 can be configured to generate a request message for the activity detector 120 to generate a user-to-transaction frequency mapping 112. The transaction mining agent 103 can be configured to parse through the log file supplied in the client's request message to generate the user-to-transaction frequency mapping 112. To do so, for each user identity recorded or otherwise identified in the log file, the transaction mining agent component 103 can be configured to determine all types of transactions performed by that user and the frequency of those transactions. Table 2 illustrates an exemplary user-to-frequency mapping 112 as generated for either users ($u_1, \ldots, u_8$) and transactions ($t_1, \ldots, t_5$).

TABLE 2

An example of a user-to-transaction frequency mapping.

| User identifiers | Transaction types | | | | |
|---|---|---|---|---|---|
| | $t_1$ | $t_2$ | $t_3$ | $t_4$ | $t_5$ |
| $u_1$ | 0 | 0 | 3 | 0 | 0 |
| $u_2$ | 0 | 0 | 0 | 7 | 0 |
| $u_3$ | 0 | 0 | 2 | 1 | 0 |
| $u_4$ | 0 | 0 | 4 | 0 | 0 |
| $u_5$ | 6 | 0 | 9 | 0 | 0 |
| $u_6$ | 0 | 2 | 0 | 0 | 10 |
| $u_7$ | 2 | 0 | 6 | 8 | 0 |
| $u_8$ | 5 | 0 | 4 | 2 | 0 |

In the above TABLE 2, rows are identified by user identifiers ($u_i$) and columns are identified by transaction types ($t_j$). The value 0 indicates that no occurrence was found in the log file of a given user performing a given transaction type. A value greater than 0 indicates the number of times that a given user performed a given transaction type, i.e., a particular frequency. In some implementations, terminal identification information can be included in the log file.

Once the user-to-transaction frequency mapping has been generated, it can be provided to the transaction profile generator 104. The transaction profile generator 104 can be configured to generate transaction profiles 119 and associated user groups 117. Table 3 illustrates exemplary transaction profiles and user groups for transactions and users identified in TABLE 2 above.

TABLE 3

An example of transaction profiles and user groups.

| Transaction profile | User group | User identifiers | Transaction types | | | | |
|---|---|---|---|---|---|---|---|
| | | | $t_1$ | $t_2$ | $t_3$ | $t_4$ | $t_5$ |
| $tp_1$ | $ug_1$ | $u_1$ | 0 | 0 | 3 | 0 | 0 |
| | | $u_4$ | 0 | 0 | 4 | 0 | 0 |
| $tp_2$ | $ug_2$ | $u_2$ | 0 | 0 | 0 | 7 | 0 |
| $tp_3$ | $ug_3$ | $u_3$ | 0 | 0 | 2 | 1 | 0 |
| $tp_4$ | $ug_4$ | $u_5$ | 6 | 0 | 9 | 0 | 0 |
| $tp_5$ | $ug_5$ | $u_6$ | 0 | 2 | 0 | 0 | 10 |
| $tp_6$ | $ug_6$ | $u_7$ | 2 | 0 | 6 | 8 | 0 |
| | | $u_8$ | 5 | 0 | 4 | 2 | 0 |

As can be understood by one having ordinary skill in the relevant art, TABLE 3 provides an exemplary illustration of a transaction profile that can be generated based on a particular log of transactions provided to the system 100. It should be further understood that the current subject matter need not be limited to the illustrated example and other ways of generating a transaction profile are possible. Referring back to TABLE 3, the generated transaction profile can include a column containing transaction profile identifiers ($tp_i$, where i=1, 2, 3 . . . ), a user group column containing user group identifiers ($ug_j$, where j=1, 2, 3, . . . ), user identifiers ($u_k$, where k=1, 2, 3 . . . ), and transaction type identifiers ($t_l$, where l=1, 2, 3, . . . ). Other parameters can be included as well. Users ($u_k$) can be grouped according to various user groups ($ug_j$) based on the performed transactions as identified by the transaction type identifiers ($t_l$).

Each distinct list of transaction types ($t_l$) can represent a transaction profile ($tp_i$). User identifiers ($u_k$) with the same set of transaction types ($t_l$) can be grouped into one user group ($ug_j$). Each user identifier ($u_k$) can be assigned to one and only one user group ($ug_j$) and each transaction profile ($tp_i$) can be associated with one and only one user group ($ug_j$). For example, user ($u_1$) performed three transactions of type ($t_3$) and user ($u_2$) performed four transactions of type ($t_3$) and neither of these users performed transactions of types ($t_1, t_2, t_4,$ and $t_5$), as indicated by value of zero in Table 3. As shown in Table 3, in some exemplary implementations, anytime a specific transaction is performed, a value corresponding to that transaction's identifier ($t_l$) can be incremented by one. If no transactions of specific type are performed, the value corresponding to that transaction type can be zero. Referring back to the example of users ($u_1$) and ($u_2$), these users can be grouped into a single user group ($ug_1$) in light of them performing transactions of similar types. That user group ($ug_1$) corresponds to a transaction profile ($tp_1$). As can be understood by one having ordinary skill in the relevant art, transaction profiles ($tp_i$) can be configured to have zero or more user groups ($ug_j$), where each user group ($ug_j$) can include zero or more user ($u_k$) that can perform zero or more transactions corresponding to one or more transaction types ($t_1$).

Table 4 is a derivation of Table 3 shown above and illustrates a correlation between transaction profiles, transaction types, and user groups.

TABLE 4

An example of transaction profiles, transaction types and user group correlations.

| Transaction profiles | Transaction types | User groups |
|---|---|---|
| $tp_1$ | {$t_3$} | $ug_1$ |
| $tp_2$ | {$t_4$} | $ug_2$ |
| $tp_3$ | {$t_3, t_4$} | $ug_3$ |
| $tp_4$ | {$t_1, t_3$} | $ug_4$ |
| $tp_5$ | {$t_2, t_5$} | $ug_5$ |
| $tp_6$ | {$t_1, t_3, t_4$} | $ug_6$ |

Figure 2:
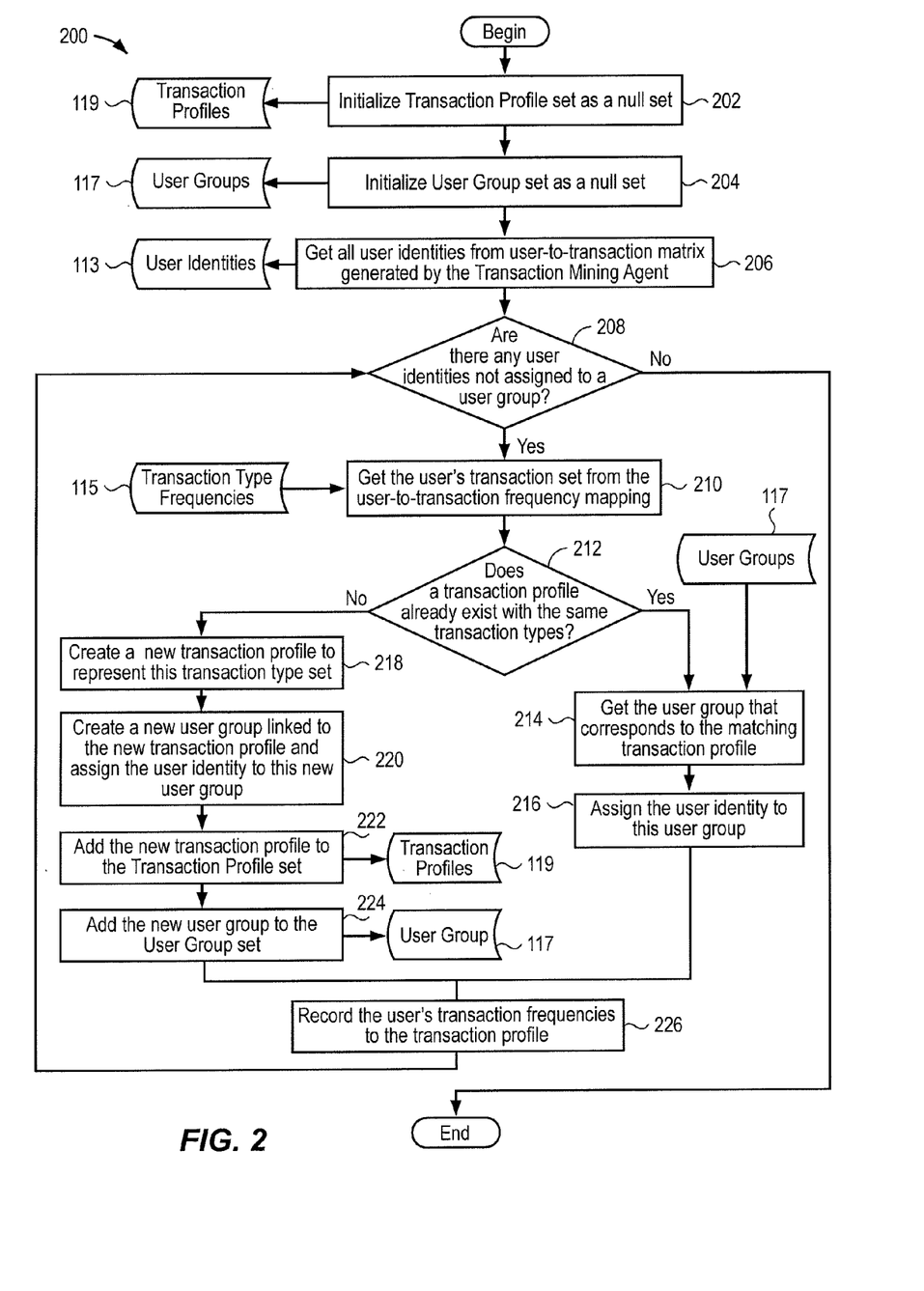
FIG. 2 is a flow chart illustrating a method for generating a mapping of transaction profile(s) to user group(s), according to some implementations of the current subject matter.

FIG. 2 is a flow chart illustrating an exemplary method 200 for generating a transaction profile with mapping to a user group, according to some implementations of the current subject matter. In some implementations, the method 200 can include initializing a set or sets of transaction profiles at 202 and a set or sets of user groups at 204, thereby generating an initialized set or sets of transaction profiles 119 and user groups 117. As can be understood by one skilled in the art, sets of transaction profiles and/or user groups can be initialized at any value (including a NULL value). At 206, user identities 113 from user-to-transaction mapping or matrix can be obtained from the transaction mining agent 103.

At 208, the transaction profile generator 104 can be configured to determine whether there exist any user identifies that have not yet been assigned to a particular user group. If there are none, the process 200 can be terminated. If there exist user identities that have not been assigned to a user group, the processing proceeds. At 210, transaction type frequencies 115 can be supplied to the transaction profile generator 104. The transaction type frequencies 115 can be configured to be stored in a database or in any other location in memory and further configured to indicate for each user the number of transactions corresponding to a particular transaction type that that user has performed. Subsequent to obtaining transaction type frequencies 115 at 210, the transaction profile generator can determine whether there already exists a transaction profile having the same transaction types as have been previously identified, as indicated at 212. If so, at 214, based on the information on user groups 117, particular user group or groups can be obtained that correspond to the matching transaction profile. Then, at 216, the unassigned user identity, as determined at 208, can be assigned to the obtained user group or groups. At 226, the user's transaction frequencies are recorded in the transaction profile. Then, the processing can return to 208.

If the transaction profile does not exist for a particular transaction type, at 218 a new transaction profile can be created to represent this new transaction type. A new user group can be created and linked to the newly-created transaction profile, and user identity or identities can be assigned to the user group, at 220. Further, the new transaction profile can be added to the transaction profile set 119, as indicated at 222, and the user group can be added to the user group set 117, as indicated at 224. Once the transaction profile and user group sets are updated in this fashion, these changes can be recorded, as illustrated at 226.

Once the transaction profile with mapping to user groups is determined, it can be provided to the directed acyclic graph generator component 106 for generation of transaction profiles with parent and child relationships. Specifically, the directed acyclic graph generator 106 can be configured to use the transaction profiles ($tp_i$) and user groups ($ug_j$) created by the transaction profile generator 104 to create a directed acyclic graph of transaction profiles. The generator 106 can be configured to generate a mapping or a graph based on the relationships between transaction profiles ($tp_i$). From this graph, it can be possible to determine various relationships between different transaction profiles, if such relationships exist. In some implementations, the graph can represent a hierarchy of transaction profiles ($tp_i$) such that ancestor transaction profile nodes form subsets of their descendent transaction profile nodes, which can be based on the transaction types in each node. Table 5 illustrates an exemplary transaction profile with parent and child relationships generated based on the generated transaction profiles ($tp_i$).

TABLE 5

An example of transaction profiles with parent and child relationships

| TP | Parent of TP | Child of TP |
|---|---|---|
| $tp_1$ | $tp_3, tp_4$ | — |
| $tp_2$ | $tp_3$ | — |
| $tp_3$ | $tp_6$ | $tp_1, tp_2$ |
| $tp_4$ | $tp_6$ | $tp_1$ |
| $tp_5$ | — | — |
| $tp_6$ | — | $tp_3, tp_4$ |

Each transaction profile ($tp_i$) in Table 5 has been obtained using the transaction profile generator 104 and is illustrated in Table 3. For example, transaction profile ($tp_1$) corresponds to three transactions of type ($t_3$); transaction profile ($tp_3$) corresponds to two transactions of type ($t_3$) and one transaction of type ($t_4$); transaction profile ($tp_4$) corresponds to six transactions of type ($t_1$) and nine transactions of type ($t_3$). Since transactions ($t_3$) are common to the set of transaction profiles ($tp_1$), ($tp_3$), and ($tp_4$) and set of transaction profiles ($tp_3$) and ($tp_4$) include additional transaction types, set of transaction profiles ($tp_3$) and ($tp_4$) can be considered a "child" transaction profile of set of transaction profiles ($tp_1$), whereas transaction profile ($tp_1$) can be considered a "parent" transaction profile of transaction profiles ($tp_3$) and ($tp_4$).

Figure 5:
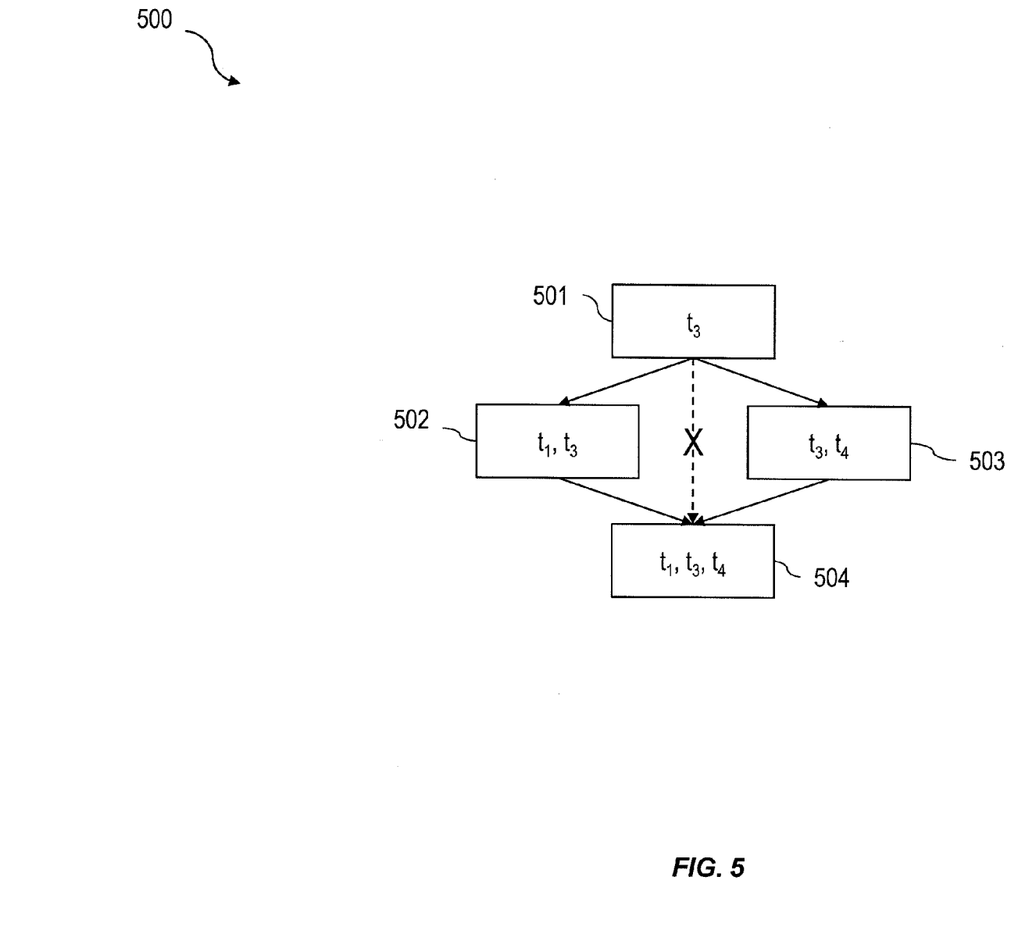
FIG. 5 illustrates an exemplary mapping of transaction profile nodes, according to some implementations of the current subject matter.

In some implementations, a directed acyclic graph can include a set of transaction profile nodes and a set of directed edges, as shown in FIG. 5. A transaction profile node can contain a single transaction profile derived by the transaction profile generator 104. A directed edge can be connected from one transaction profile node to another where the transaction types in the transaction profile of the former are a proper subset of the transaction types in the transaction profile of the latter. For example, as shown in FIG. 5, a node 501 containing transaction type ($t_3$) can be a proper subset of a node 502 containing transaction types ($t_1, t_3$) and a node 503 containing transaction types ($t_3, t_4$). A transaction profile node need not have a directed edge to a transaction profile node which is a descendent of at least one child node of the former node as these edges are redundant, as illustrated in TABLE 5 and FIG. 5. For example, the node 501 containing transaction type ($t_3$) need not have a directed edge to the node 504 containing transaction types ($t_1$, $t_3$, $t_4$) because the node 504 has parent nodes 502, 503 containing transaction types ($t_1$, $t_3$) and ($t_3$, $t_4$), respectively.

Figure 6:
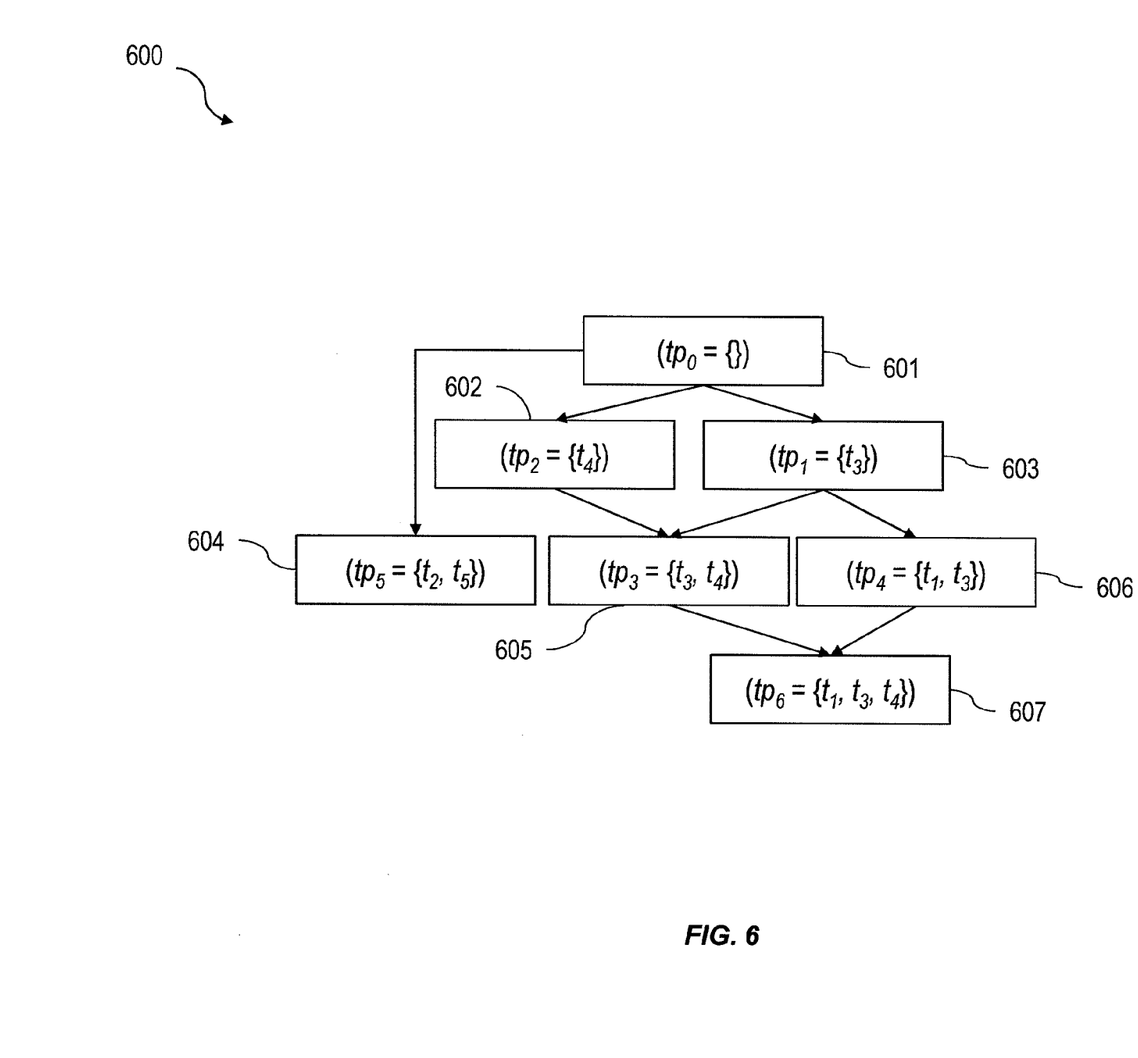
FIG. 6 illustrates an exemplary directed acyclic graph, according to some implementations of the current subject matter.

In some implementations, the directed acyclic graph can be initialized with a special node containing a null transaction profile which can serve as a root node in a hierarchy of transaction profiles (as shown in FIG. 6). Because the root node can be a proper subset of all transaction profiles, it can be configured to act as an ancestor for all transaction profile nodes that are added to the graph. Once the directed acyclic graph is generated, the root node can be ignored in all subsequent analysis.

In some implementations, transaction profile nodes can be added to the graph in order of a cardinality of a transaction profile. A cardinality of a transaction profile corresponds to a number of transaction types in that transaction profile. The cardinality of the transaction profile can be configured to range from a lowest number to the highest number. For example, referring to TABLE 3, the cardinality of the transaction profile ($tp_1$) can be one, as it contains only one type of transactions ($t_3$), whereas the cardinality of the transaction profile ($tp_6$) is three, because it contains three types of transactions ($t_1$), ($t_3$), and ($t_4$). When adding a new transaction profile node, its transaction profile can be checked against other transaction profiles in the graph to check for the existence of proper subsets. If a subset relationship is detected which satisfies the condition described in Table 5, an edge from the parent transaction profile node to the child transaction profile node can be created.

Figure 3:
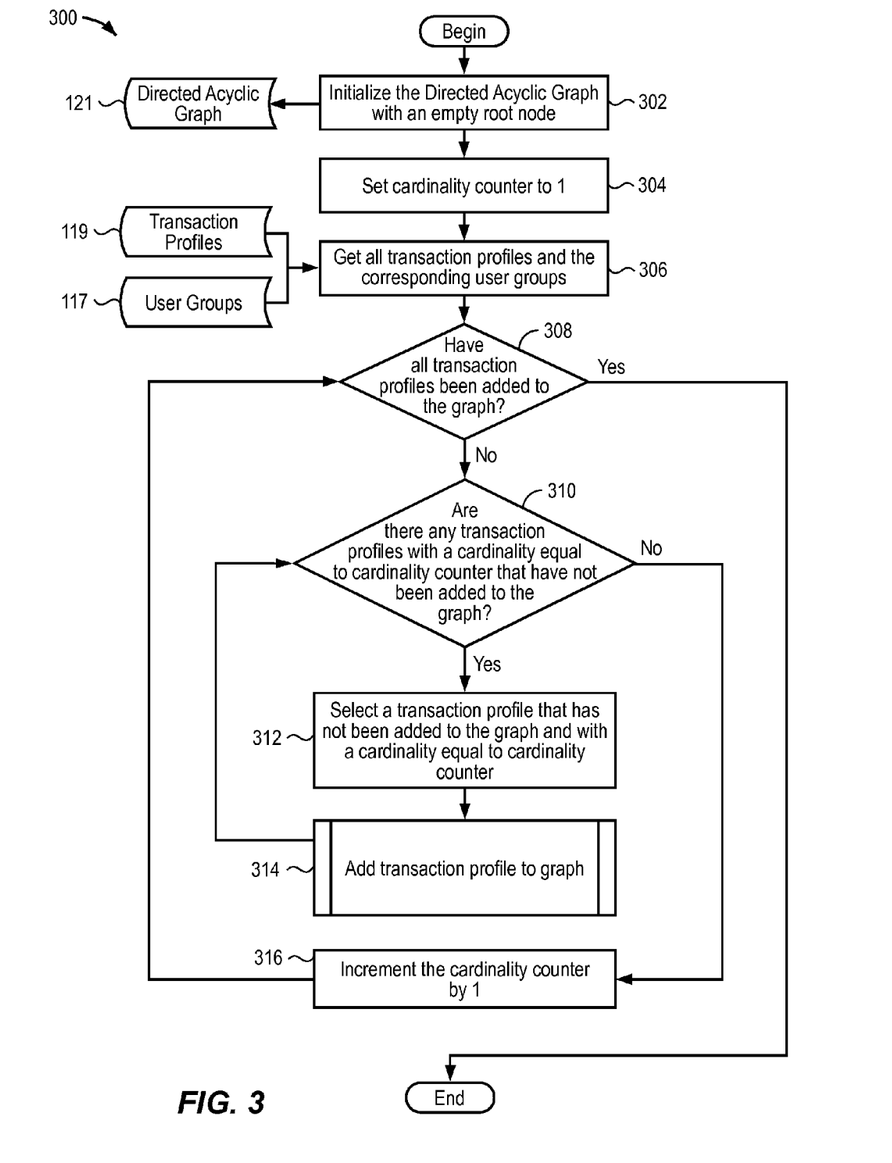
FIG. 3 is a flow chart illustrating an exemplary method for generating a directed acyclic graph of transaction profile(s), according to some implementations of the current subject matter.

FIG. 3 is a flow chart illustrating an exemplary method 300 for generating a directed acyclic graph, according to some implementations of the current subject matter. At 302 and 304, respectively, a directed acyclic graph 121 can be initialized with an empty node and a cardinality counter can be set to one. Information concerning transaction profiles 119 and corresponding user groups 117 can be obtained at 306. At 308, the directed acyclic graph generator can be configured to determine whether all transaction profiles have been added to the directed acyclic graph 121. If so, the processing can be terminated. Otherwise, the generator 106 can be further configured to determine whether there exist any transaction profiles that have cardinality equal to the cardinality counter and that have not been added to the directed acyclic graph 121, as indicated at 310. If so, such transaction profiles are selected, as indicated at 312, and added to the graph 121, as indicated at 314, and the processing returns to 310. If at 310 the directed acyclic graph generator 106 determines that there are no additional transaction profiles having cardinality equal to the cardinality counter and that have not been added to the graph 121, the cardinality counter is incremented by one, as illustrated at 316.

Figure 4:
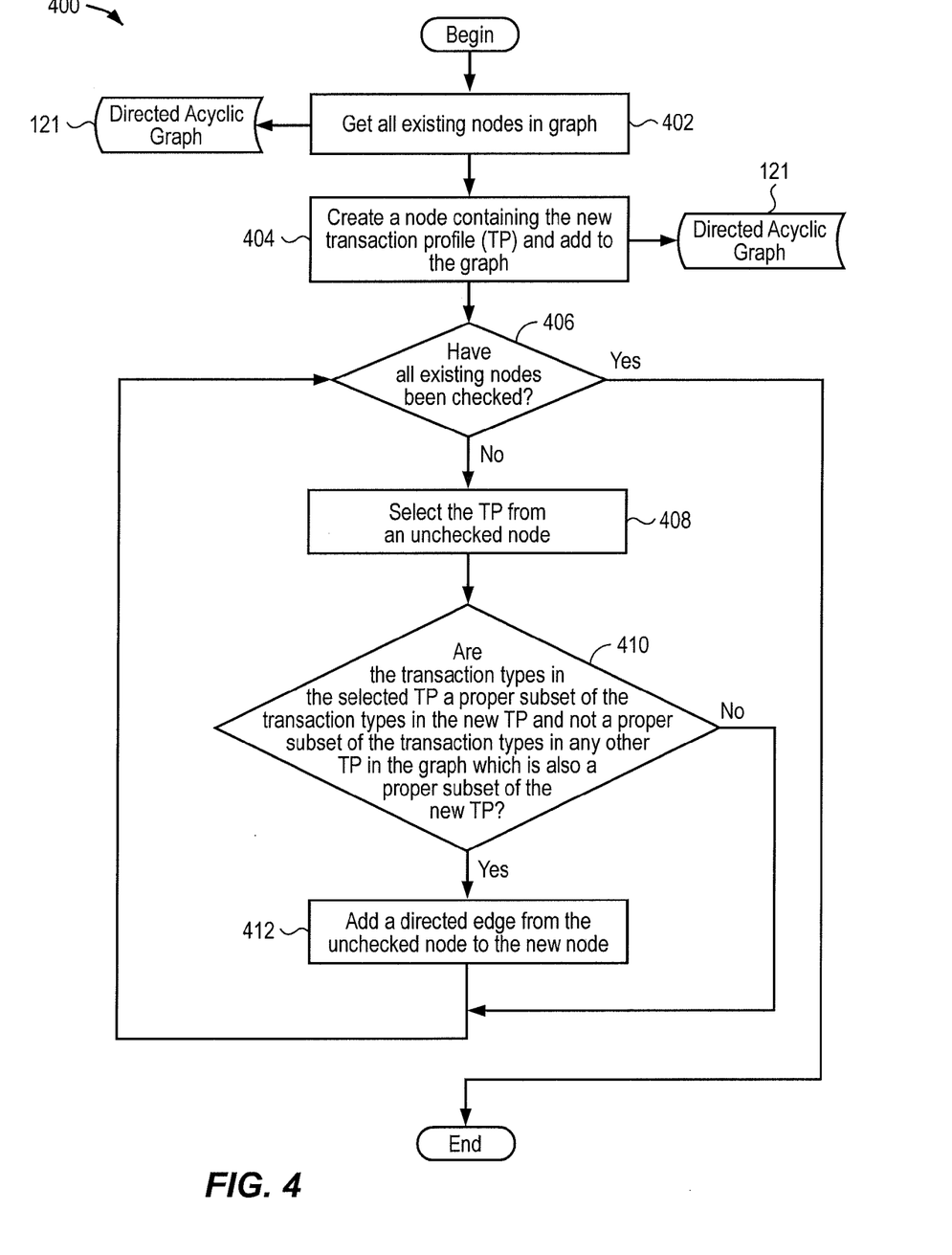
FIG. 4 is a flow chart illustrating an exemplary method for adding a transaction profile to the directed acyclic graph generated in FIG. 3, according to some implementations of the current subject matter.

FIG. 4 illustrates an exemplary method 400 for adding a transaction profile to the directed acyclic graph 121, according to some implementations of the current subject matter. The method 400 can be part of the operations occurring at 314 of the method 300 shown and discussed in connection with FIG. 3. At 402 and 404, all existing nodes in the graph 121 can be obtained and a node containing a new transaction profile (or one that has not been previously added to the graph 121) can be created and added to the graph 121, respectively. At 406, the directed acyclic graph generator 106 can be configured to determine whether all existing nodes in the graph 121 have been checked or otherwise processed. If so, the processing ends. If not, the generator 106 can select the transaction profile from a node that has not been checked or processed, as indicated at 408. At 410, the generator can determine whether the transaction types in the selected transaction profile represent a proper subset of the transaction types in the newly created transaction profile but are not a proper subset of the transaction types in any other transaction profiles in the graph 121, which are proper subsets of the newly created transaction profile. If not, the processing returns to 406. Otherwise, a directed edge from the selected unchecked node can added to the new node, as illustrated at 412.

FIG. 6 illustrates an exemplary directed acyclic graph 121, according to some implementations of the current subject matter. The graph can be initialized with a null value assigned to the transaction profile ($tp_0$) 601. Based on the information in TABLE 3, the transaction profile ($tp_2$) 602 containing transaction type $\{t_4\}$ and transaction profile ($tp_1$) 603 containing transaction type $\{t_3\}$ can both form respective directed edges with the null transaction profile ($tp_0$). The null transaction profile ($tp_0$) 601 can also form a directed edge with transaction profile ($tp_5$) 604 containing transaction types $\{t_2, t_5\}$. The transaction profile 604 has no child or parent nodes. Because transaction profile ($tp_3$) 605 contains transaction types $\{t_3, t_4\}$ and transaction profile ($tp_2$) 602 contains transaction type $\{t_4\}$, these transaction profiles form a directed edge between one another, as shown in FIG. 6. Similarly transaction profile ($tp_1$) 603 and transaction profiles ($tp_3$) 605 and ($tp_4$) 606 form directed edges as well. Transaction profile ($tp_6$) 607 containing transaction type $\{t_1, t_3, t_4\}$ forms directed edges with transaction profiles ($tp_3$) 605 and ($tp_4$) 606 by virtue of having at two transaction types in common, respectively.

The generated acyclic graphs 121 can be used to determine various anomalies in transaction activity of user(s) or transactions that are performed by the users. To determine whether any particular user performed an anomalous transaction or is involved in an anomalous transaction activity, the anomaly detector component 108 can be used.

In some implementations, the anomaly detector 108 can be configured to detect and analyze the generated directed acyclic graph 121 to search for anomalous transaction or user activity as defined in an anomaly type definitions database 142. The anomaly types can depend on various variables or threshold values, changes in which may indicate an anomalous activity by a particular user. For example, a user who has not been granted a status of an administrator can be performing administrator-only functions (e.g., installation of software to the system that has not been authorized). Such variables or thresholds can be typically supplied by the client 130 in a request message (requesting analysis of the preprocessed log file 132) to the detector 108. The thresholds can be supplied from a threshold values database 154, as shown in FIG. 1. If the anomaly detector 108 detects any anomalous user activity, the transaction profiles detected can be marked (e.g., as "red flags") and returned in the response message to the client 130.

In some implementations, it can be possible to define customized anomaly types, as illustrated in FIGS. 7A-7E. Anomaly types can be expressed in terms of relationships between the number of users, number of transaction types, frequency of transaction usage, and any other factors between transaction profiles and/or within transaction profiles. The following is a discussion of at least anomaly types that can be defined in accordance with implementations of the current subject matter. As can be understood by one having ordinary skill in the relevant art, the anomaly types discussed below are provided here for illustrative, non-limiting purposes and other anomaly types can be possible.

Figures 7A, 7B, 7D:
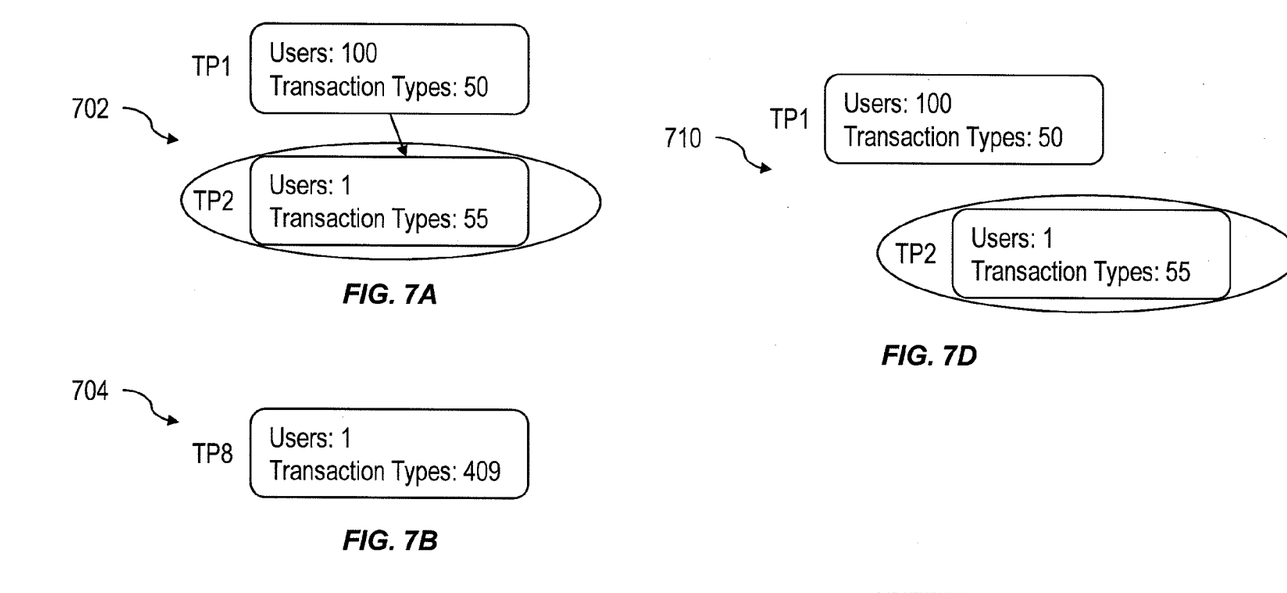
FIGS. 7A, 7B, 7C, 7D, and 7E illustrate exemplary anomaly types, according to some implementations of the current subject matter.

FIG. 7A illustrates an exemplary anomaly type 702, according to some implementations of the current subject matter. Based on this anomaly type, the anomaly detector 108 can be configured to detect transaction activity of a small group of users who behave slightly differently than a large group of users by performing some small number of additional transaction types. The number of additional transaction types used to detect this anomaly type can be set as a threshold value, $\Delta_{trans}$, e.g., one, two, three, etc., extra transaction types, and the difference in the number of users with the two transaction profiles can likewise be set as some threshold, $\Delta_{users}$. For example, the small group could be one-tenth of the number of users in the large group. As shown in FIG. 7A, the anomaly detector can be configured to detect transaction activity corresponding to 100 users performing 50 different transaction types and one user performing 5 extra transaction types. The transaction activity corresponding to these extra 5 transaction types performed by this user can be deemed as an anomaly or an anomalous transaction activity and the client can be appropriately alerted in the response message. In some implementations, exception(s) can be defined that may prevent generating of false alerts or red flags. For example, a particular user performing extra transaction types can fall in some defined category of exceptions, whereby that user only is allowed to perform extra transaction types in relation to other users (e.g., a chair of a department within a company can be allowed to perform more transaction types than his/her subordinates).

FIG. 7B illustrates another exemplary anomaly type 704, according to some implementations of the current subject matter. For this anomaly type, the anomaly detector 108 can be configured to detect transaction activity based on transaction profiles of users which have a large number of transactions that are being performed by a small number of users. For example, some users can have accumulated many roles over the course of their employment in an organization. The number of users can be set with some threshold value, $\Delta_{users}$, and the number of transactions can be set with another threshold value, $\Delta_{trans}$. These transaction profiles can represent administrators of the system which can mean that the transaction activity corresponding to these transaction profiles is not anomalous. The user threshold value can be set based on the known number of system administrators to reduce the number of false positives. The user can in some examples add such profiles to a white list that is looked up to suppress red flags for legitimate profiles. In some implementations, in addition to generating exceptions for particular user profiles (e.g., administrators), various lists of particular excepted transaction types, transaction types requiring permissions, etc., for a particular user profile can be consulted to determine whether or not there exists an anomaly. This can prevent fraudulent activities by the users that have been granted special privileges to perform a large number of transactions, e.g., administrators.

Figure 7C:
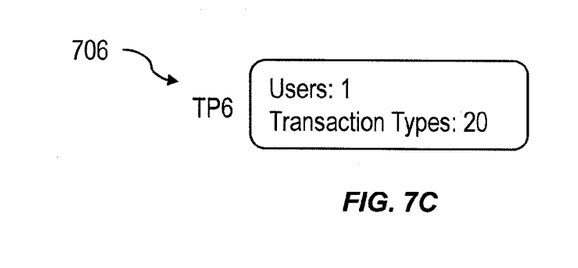

FIG. 7C illustrates yet another exemplary anomaly type 706, according to some implementations of the current subject matter. To detect this anomaly type, the anomaly detector 108 can be configured to detect transaction activity based on transaction profiles which are completely separate from all other transaction profiles, i.e., transaction profiles where none of the transaction types in the transaction profile can be found in any other transaction profile. But for any exceptions, such users having these transaction profiles can be located and flagged, simply because they share no transaction types with any other users.

FIG. 7D illustrates another exemplary anomaly type 710, according to some implementations of the current subject matter. In this scenario, the anomaly detector 108 can be configured to detect transaction activity of users who behave slightly differently than a large group of users without the restriction that the latter transaction profile needs to be a proper subset of the former. In other words, for anomaly type 710, the anomaly detector 108 can detect anomalies in those transaction profiles that are related, that is, they share some transaction types but do not have a strict subset-superset relationship between them. These transaction profiles may not be represented as a parent-child relationship in the directed acyclic graph 121. For this anomaly type, the anomaly detector 108 also detects differences within transaction profiles at the same level (or cardinality) which may or may not have the same parent node. In fact these transaction profiles may not have the same cardinality or be a part of the same branch of the graph or may be an isolated node.

Figure 7E:
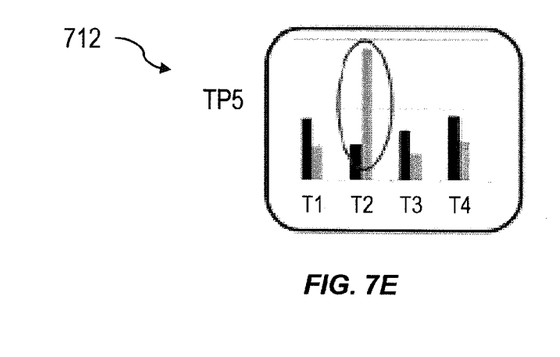

FIG. 7E illustrates yet another anomaly type 712, according to some implementations of the current subject matter. This anomaly type can relate to transaction activity that is based on transaction frequencies rather than transaction types. The transaction profiles of users with identical or similar transaction profiles with respect to the types of transactions can be compared with respect to the frequency of execution of those transaction types. Frequency thresholds can be set to identify significant or anomalous differences between the transaction profiles. The comparing can include comparisons of the transaction types and their frequencies in transaction profiles that have more than one user in the user group. The transaction frequencies can be normalized and red flags can be identified based on specified threshold values. For example, as shown in FIG. 7E, a transaction profile can include two users that have performed four transaction types. In the illustrated example, it appears that the second user has performed a larger number of transaction type two than a designated threshold. As such, the second user's activities will be flagged as an anomaly. As stated above, all anomalies can be subject to a set of exceptions that can be defined by the client in the request message and users performing certain number and/or types of transactions that otherwise would be considered an anomaly, can be excluded from the response message to the client.

Figure 8:
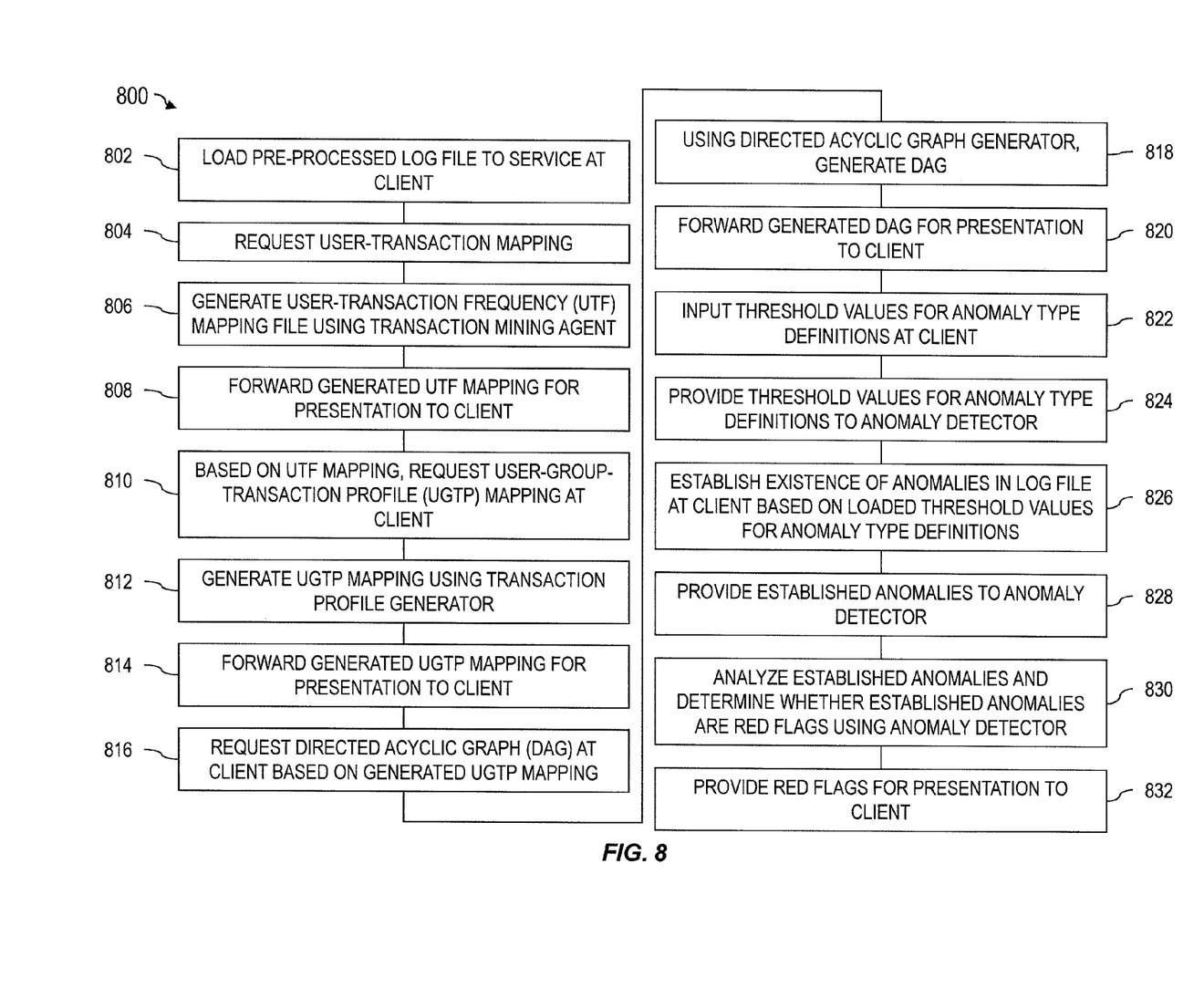
FIG. 8 is a flow chart illustrating a method for determining existence of anomalies, according to some implementations of the current subject matter.

FIG. 8 shows a flow chart 800 illustrating features of a method for detecting an anomalous activity by a user that is consistent with at least one implementation of the current subject matter. The method 800 can be performed by the exemplary system 100 illustrated in FIG. 1. The method 800 also provides interaction between various components of the system 100, including the client 130, service 122, and anomalous activity user activity detector 120, which includes transaction mining agent 103, transaction profile generator 104, directed acyclic graph generator 106, and anomaly detector 108. At 802, preprocessed log file 132 can be loaded from the client (or a client's front end component 144) to the service 122 (in some implementations, the service component 122 and the front end component 144 can be represented by a software or a server providing communication capabilities to the client 130 and the system 120). Once the file 132 is loaded, the client can request a user-transaction mapping from the transaction mining agent 103, at 804. The transaction mining agent 103 can generate the user transaction frequency ("UTF") mapping file 112, as indicated at 806. The UTF mapping file 112 can be generated using user identifiers 113 and transaction type frequencies 115, as discussed above. At 808, the generated UTF mapping file 112 can be forwarded through the service 122 and front end 144 for the presentation to the client 130. Then, the client, through the front end 144 and the service 122, can request a user-group-transaction profile ("UGTP") mapping from the transaction profile generator 104, as indicated at 810. The transaction profile generator 104 can use user group information 117 and transaction profiles 119 to generate the UGTP mapping, as illustrated at 812. At 814, the generated UGTP mapping can be forwarded to the client 130 through the service 122 and front end 144. Based on the received UGTP mapping, the client 130 can request, through the service 122, generation of a directed acyclic graph of the transaction profiles from the directed acyclic graph generator 106, as shown at 816. The acyclic graph generator 106 can generate the directed acyclic graph 121 (as indicated at 818) and forward it, through the service 122 and front end 144, to the client 130, as shown at 820. At 822, the client 130 (or its administrator) can input threshold values for anomaly type definitions 142 and provides them, through the service 122 and front end 144, to the anomaly detector 108, as shown at 824. At 826, the client 130 can also determine or establish the existence of anomalies based on the generated directed acyclic graph and provide any identified anomalies to the anomaly detector 108 via service 122 and front end 144, as shown at 828. Based on the threshold values and established anomalies received from the client 130, the anomaly detector 108 can determine whether the established anomalies are actual anomalies or red flags, as shown at 830, and advise the client 130 (via service 122 and front end 144) accordingly, as shown at 832.

Figure 9:
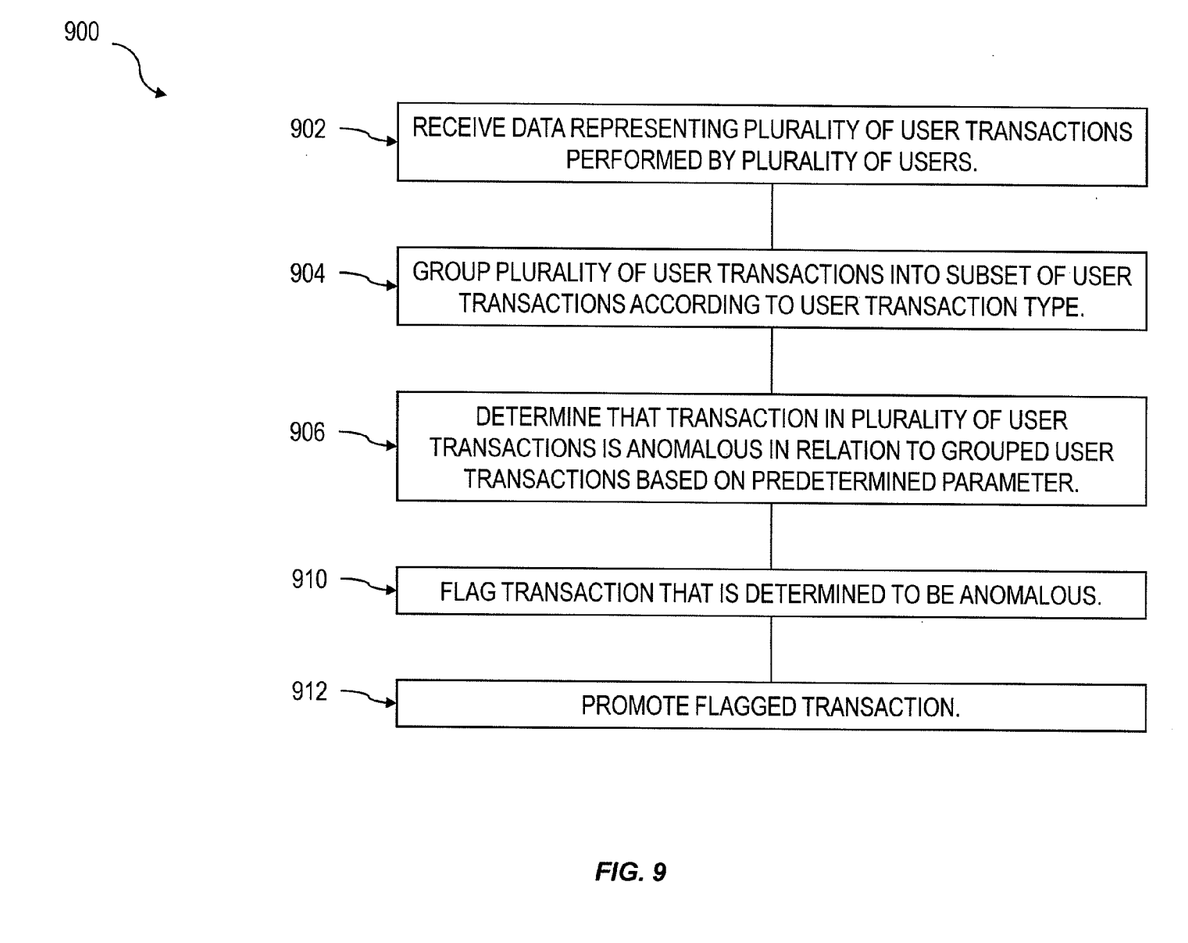
FIG. 9 is a flow chart illustrating a method.

FIG. 9 shows a flow chart 900 illustrating a method consistent with at least one implementation of the current subject matter. At 902, data representing a transaction activity corresponding to a plurality of user transactions performed by a plurality of users can be received, for example at an anomalous user activity detector 120. The plurality of user transactions can be grouped at 904 into at least one subset of user transactions according to user transaction type. The grouping can be such that each subset of user transactions includes user transactions of the plurality of user transactions having a similar user transaction type. At 906, the transaction activity can be determined to be anomalous in relation to the grouped user transactions based on a predetermined parameter. The transaction activity that is determined to be anomalous can be flagged at 910. At 912, the flagged transaction can be promoted. Promoting of a flagged transaction can include, but is not limited to, one or more of displaying the flag to a user via a display device, sending an electronic notification to a user, storing a record of the flagged transaction to a computer-readable medium or other storage device, generating a printed record of the flagged transaction, activating a visible or audible alert, or the like.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they may include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" may refer to any entity including a person or a computer. Although ordinal numbers such as first, second, and the like may, in some situations, relate to an order, as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a non-transitory machine-readable medium storing instructions that, when executed by at least one processor, cause the at least one processor to perform operations comprising:
   receiving, at a server, data representing a plurality of user transactions performed by a plurality of users of an enterprise resource management system, the plurality of user transactions comprising a plurality of electronic transactions within the enterprise resource management system;
   grouping, at the server, each of the plurality of user transactions into at least one subset of user transactions according to at least one user transaction type associated with each transaction of the plurality of user transactions, such that each of the at least one subset of user transactions includes user transactions of the plurality of user transactions having a similar user transaction type, wherein each of the at least one user transaction types are associated with at least one activity performed by the plurality of users;
   generating, at the server, a directed acyclic graph based on the grouping, the directed acyclic graph defining relationships among the at least one subset of user transactions;
   determining, at the server, whether user transactions of a first subset are anomalous in relation to other subsets of user transactions in the grouped user transactions by at least searching the directed acyclic graph for a predetermined parameter, wherein the searching for the predetermined parameter comprises determining whether at least one user associated with the first subset performs at least one of:
      a first threshold quantity of additional activities compared to other users from the plurality of users,
      a second threshold quantity of additional activity types compared to the other users,
      a transaction type that none of the other users perform, and
      a third threshold quantity of additional activities of a particular type compared to a group of users to which the at least one user belongs, wherein the group of users is a subset of the other users; and
   providing, by the server and via a network, an indication to a client device that a transaction activity associated with the at least one user is determined to be anomalous such that the client device may perform one of causing the transaction activity to be displayed to a key user via a display device, sending an electronic notification to the key user, causing a record of the transaction activity to be stored at a storage device, causing a printed record of the transaction activity to be generated, and causing a visible or audible alert to be activated.

2. The computer program product according to claim 1, wherein the operations further comprise:
   determining, at the server, a frequency of transactions performed by at least one user, the transactions performed by the at least one user having at least one user transaction type; and
   generating, at the server, a mapping of users and user transaction types performed by the at least one user based on the determined frequency of transactions.

3. The computer program product according to claim 2, wherein the operations further comprise:
   grouping, at the server, the plurality of users into at least one user group based on the at least one activity performed by the plurality of users;
   generating, at the server, transaction profiles based on the at least one user transaction type associated with the at least one activity performed by the plurality of users; and
   associating, at the server, the user groups and the transaction profiles based on the at least one user transaction type.

4. The computer program product according to claim 3, wherein the operations further comprise:
   generating, at the server, a mapping between the generated transaction profiles; and
   determining, at the server, a relationship between the generated transaction profiles.

5. The computer program product according to claim 4, wherein the operations further comprise:

determining, at the server, whether the first transaction activity is anomalous based on the relationship between the generated transaction profiles.

6. The computer program product according to claim 1, wherein the data representing the plurality of user transactions is received from the client device.

7. The computer program product according to claim 1, wherein the operations further comprise:
receiving, at the server, an indication of a second transaction activity that is predetermined to be not anomalous; and
excluding, at the server, the second transaction activity from determining whether the transaction activity associated with the at least one user is anomalous based on the indication of the second transaction activity.

8. A computer-implemented method comprising:
receiving, by at least one processor of a server, data representing a plurality of user transactions performed by a plurality of users of an enterprise resource management system, the plurality of user transactions comprising a plurality of electronic transactions within the enterprise resource management system;
grouping, by the at least one processor, each of the plurality of user transactions into at least one subset of user transactions according to at least one user transaction type associated with each transaction of the plurality of user transactions, such that each of the at least one subset of user transactions includes user transactions of the plurality of user transactions having a similar user transaction type, wherein each of the at least one user transaction types are associated with at least one activity performed by the plurality of users;
generating, by the at least one processor, a directed acyclic graph based on the grouping, the directed acyclic graph defining relationships among the at least one subset of user transactions;
determining, by the at least one processor, whether user transactions of a first subset are anomalous in relation to other subsets of user transactions in the grouped user transactions by at least searching the directed acyclic graph for a predetermined parameter, wherein the searching for the predetermined parameter comprises determining whether at least one user associated with the first subset performs at least one of:
a first threshold quantity of additional activities compared to other users from the plurality of users,
a second threshold quantity of additional activity types compared to the other users,
a transaction type that none of the other users perform, and
a third threshold quantity of additional activities of a particular type compared to a group of users to which the at least one user belongs, wherein the group of users is a subset of the other users; and
providing, by the at least one processor and via a network, an indication to a client device that a transaction activity associated with the at least one user is determined to be anomalous such that the client device may perform one of causing the transaction activity to be displayed to a key user via a display device, sending an electronic notification to the key user, causing a record of the transaction activity to be stored at a storage device, causing a printed record of the transaction activity to be generated, and causing a visible or audible alert to be activated.

9. The method according to claim 8, further comprising:
determining, by the at least one processor, a frequency of transactions performed by at least one user, the transactions performed by the at least one user having at least one user transaction type; and
generating, by the at least one processor, a mapping of users and user transaction types performed by the at least one user based on the determined frequency of transactions.

10. The method according to claim 9, further comprising:
grouping, by the at least one processor, the plurality of users into at least one user group based on the at least one activity performed by the plurality of users;
generating, by the at least one processor, transaction profiles based on the at least one user transaction type associated with the at least one activity performed by the plurality of users; and
associating, by the at least one processor, the user groups and the transaction profiles based on the at least one user transaction type.

11. The method according to claim 10, further comprising:
generating, by the at least one processor, a mapping between the generated transaction profiles; and
determining, by the at least one processor, a relationship between the generated transaction profiles.

12. The method according to claim 11, further comprising:
determining, by the at least one processor, whether the transaction activity is anomalous based on the relationship between generated transaction profiles.

13. The method according to claim 8, wherein the data representing the plurality of user transactions is received from the client device.

14. The method according to claim 8, further comprising:
receiving, by the at least one processor, an indication of a second transaction activity that is predetermined to be not anomalous; and
based on the indication, excluding, by the at least one processor, the second transaction activity from determining whether the transaction activity associated with the at least one user is anomalous.

15. A system comprising:
at least one processor; and
at least one machine-readable medium storing instructions that, when executed by the at least one processor, cause a server to perform operations comprising:
receiving data representing a plurality of user transactions performed by a plurality of users of an enterprise resource management system, the plurality of user transactions comprising a plurality of electronic transactions within the enterprise resource management system;
grouping each of the plurality of user transactions into at least one subset of user transactions according to at least one user transaction type associated with each transaction of the plurality of user transactions, such that each of the at least one subset of user transactions includes user transactions of the plurality of user transactions having a similar user transaction type, wherein each of the at least one user transaction types are associated with at least one activity performed by the plurality of users;
generating a directed acyclic graph based on the grouping, the directed acyclic graph defining relationships among the at least one subset of user transactions;

determining user transactions of a first subset are anomalous in relation to other subsets of user transactions in the grouped user transactions by at least searching the directed acyclic graph for a predetermined parameter, wherein the searching for the predetermined parameter comprises determining whether at least one user associated with the first subset performs at least one of:
- a first threshold quantity of additional activities compared to other users from the plurality of users,
- a second threshold quantity of additional activity types compared to the other users,
- a transaction type that none of the other users perform, and
- a third threshold quantity of additional activities of a particular type compared to a group of users to which the at least one user belongs, wherein the group of users is a subset of the other users;

providing, via a network, an indication to a client device that a transaction activity associated with the at least one user is determined to be anomalous such that the client device may perform one of causing the transaction activity to be displayed to a key user via a display device, sending an electronic notification to the key user, causing a record of the transaction activity to be stored at a storage device, causing a printed record of the transaction activity to be generated, and causing a visible or audible alert to be activated.

16. The system according to claim 15, wherein the operations further comprise at least one of:
- determining a frequency of transactions performed by at least one user, the transactions having at least one user transaction type;
- generating a mapping of users and user transaction types performed by the at least one user based on the determined frequency of transactions;
- grouping the plurality of users into at least one user group based on the at least one activity performed by the plurality of users;
- generating a plurality of transaction profiles based on the at least one user transaction type associated with the at least one activity performed by the plurality of users;
- associating the at least one user group with at least one of the plurality of transaction profiles based on the at least one user transaction type;
- generating a mapping between the generated transaction profiles, the generating comprising determining a relationship between the generated transaction profiles; and
- determining whether the transaction activity is anomalous based on the relationship between generated transaction profiles.

17. A computer program product comprising a non-transitory machine-readable medium storing instructions that, when executed by at least one processor at a server, cause the server to perform operations comprising:
- grouping, among a plurality of activity groups, a plurality of stored electronic user activities associated with an enterprise resource management system, wherein the grouping is performed according to one or more activity types associated with each activity of the plurality of stored electronic user activities, such that each of the plurality of activity groups includes user activities having the same or similar activity types, and wherein each activity of the plurality of stored electronic user activities is associated with a user from among a plurality of users utilizing the enterprise resource management system;
- generating, after the grouping, a directed acyclic graph defining relationships among the plurality of activity groups;
- determining, based on the relationships in the directed acyclic graph, whether one or more users associated with a first activity group in the grouped plurality of activity groups perform a threshold quantity of additional activities or activity types compared to one or more other activity groups from the plurality of activity groups; and
- providing, via a network and to a client device, an indication that the first activity group is anomalous when the one or more users are determined to perform the threshold quantity of additional activities or activity types.

18. The computer program product according to claim 17, wherein the acyclic graph is generated based on: generating, for each activity group of the plurality of activity groups, a node in the acyclic graph; and generating, for each node in the acyclic graph, an edge to at least one other node when the one or more activity types within an activity group associated with the node contain a subset of activity types within another activity group associated with the at least one other node.

19. The computer program product according to claim 18, wherein determining whether the one or more users associated with the first activity group perform a threshold quantity of additional activities or activity types comprises comparing the at least one other node against the node containing the subset of activity types.

* * * * *